United States Patent [19]

Klein

[11] Patent Number: 4,560,134
[45] Date of Patent: Dec. 24, 1985

[54] ADJUSTABLE GUN RACK FOR AUTOMOTIVE PASSENGER COMPARTMENTS

[76] Inventor: John M. Klein, 5100 Wah Ta Wah, Clarkston, Mich. 48016

[21] Appl. No.: 528,583

[22] Filed: Sep. 1, 1983

[51] Int. Cl.⁴ ............................................. F16M 13/00
[52] U.S. Cl. .................................... 248/511; 224/913; 248/553
[58] Field of Search ............... 248/551, 553, 511, 534, 248/536, 538, 166, 237; 211/64; 224/913, 42.45 R, 311, 315

[56] References Cited

U.S. PATENT DOCUMENTS

| 554,252 | 2/1896 | Falk | 211/64 |
|---|---|---|---|
| 1,914,259 | 6/1933 | Irwin | 211/64 X |
| 2,446,093 | 7/1948 | Lambert | 248/237 |
| 2,984,444 | 5/1961 | Lewis | 248/166 |
| 3,802,612 | 4/1974 | Smith | 224/913 X |
| 3,910,382 | 10/1975 | Justice | 211/64 X |
| 4,364,499 | 12/1982 | McCue | 224/913 X |

FOREIGN PATENT DOCUMENTS

| 1061753 | 9/1979 | Canada | 224/42.45 R |
|---|---|---|---|
| 1542603 | 9/1968 | France | 248/520 |

*Primary Examiner*—J. Franklin Foss
*Attorney, Agent, or Firm*—John R. Benefiel

[57] ABSTRACT

A gun rack is disclosed particularly adapted for mounting a shotgun within the passenger compartment of an automobile, positioned muzzle down alongside the driver's seat.

The gun rack includes an elongated frame member supported at its rear by a pair of support legs, which are independently adjustable in length and angle, and each fastened to the floor in a lowered position to establish the muzzle down position of the mounted shotgun. Rotatably adjustable hinges at the ends of either leg and the forward end of the frame, together with the adjustability of the legs, enable mounting to the widely varying transmission tunnels and floor contours of different automotive models.

The barrel of the shotgun is received in an element carried by the rack in a position above the forward end of the frame, which position is adjustable lengthwise to accommodate different shotgun barrel lengths. The element may take the form of a plug recieved within the bore of the shotgun, or a partially cylindrically shaped seat receiving the outside diameter of the forward end of the gun barrel. Also, an adjustable position trigger shroud is provided surrounding the trigger region of a shotgun disposed in the rack to prevent accidental discharge.

20 Claims, 7 Drawing Figures

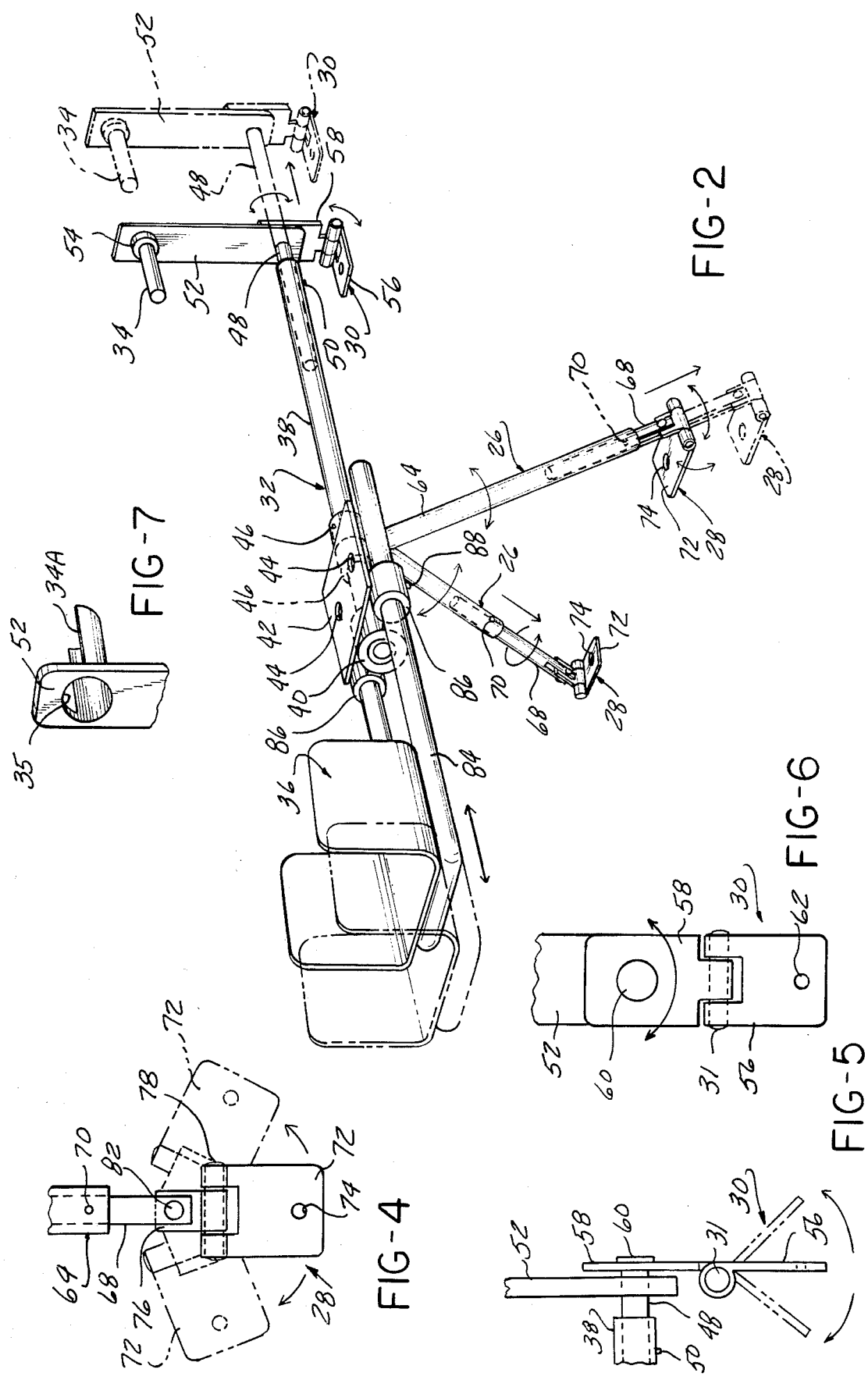

ADJUSTABLE GUN RACK FOR AUTOMOTIVE PASSENGER COMPARTMENTS

BACKGROUND DISCUSSION

The present invention relates to gun racks and more particularly to gun racks adapted to mount long guns such as shotguns within the passenger compartments of automotive vehicles.

Modern-day police forces are often equipped with patrol cars having "riot" guns, i.e., shotguns adapted to police purposes.

The preferred mounting arrangement involves a muzzle down mounted position of the shotgun, above the floor of the passenger compartment alongside the driver's seat. This out-of-sight positioning is preferred for security purposes, as well as to achieve a less intimidating presence.

Another preferred feature is the mounting of the shotgun so as to allow usability of the passenger side to allow for the presence of a second police officer during patrol.

Gun racks for such purposes have heretofore been mounted to the tunnel and adjacent floor contours of the police cars. Since such contours vary widely in differing models of cars, each gun rack has heretofore involved a custom fabrication of a mounting support, which custom fabrication is relatively costly.

Further, when a police department changes the cars in its fleet, typically a scrappage of the existing mounting frames was necessitated as well as the fabrication of an entirely new series of racks.

Desirably, such a gun rack should be adaptable to mounting to tunnel and adjacent floor configurations of the passenger compartment of widely varying size and contour, and also be adaptable to shotguns of differing models and lengths such that a single standardized gun rack may be employed. This enables racks to be manufactured at low cost and in large volumes, and to enable remounting and reuse in differing models of police cars.

Accordingly, it is an object of the present invention to provide a standardized gun rack which is adaptable for the mounting of shotguns in automotive passenger compartments, and which is adapted to widely varying automotive passenger compartment tunnel and floor contours.

It is a further object of the present invention to provide such gun rack which is also adaptable to varying shotgun configurations.

SUMMARY OF THE INVENTION

The present invention achieves these objects by adjustable members associated with the gun rack which allows for an almost infinite variation in the contours of the mounting surfaces. The gun rack comprises a main elongated frame member which may be mounted to the tunnel and floor surfaces of the passenger compartments. The main frame member is supported at its rear end by a pair of legs which are angularly adjustable with respect to the main support member and also independently adjustable in length.

Pivotally mounted to the ends of each of the support legs is a hinge, one element of which is directly mounted to the tunnel or floor surfaces. A pivotally mounted hinge element is also provided at the forward end of the elongate frame member, such as to create a tilted down orientation of the rack.

The frame member includes a support surface adapted to receive and have mounted thereto a gun lock mechanism which receives the receiver and/or frame of the mounted shotgun.

At the forward end of the main frame there is provided an elongated barrel receiving element, preferably of a non-marring plastic, which is received into the bore of the long gun. The lengthwise position of the element is adjustable to accommodate differing barrel lengths. Alternatively, a partially cylindrical stirrup element is aligned with a through opening in the support plate.

To the rear of the main frame there is supported a trigger shroud which is also adjustable lengthwise to provide a surrounding shrouding of the trigger region of the supported shotgun in order to protect against an accidental discharge. The adjustability of the lengthwise position accommodates different shotgun receiver configurations and the trigger location on the shotgun.

BRIEF DESCRIPTION OF THE DRAWINGS

FIG. 2 is a perspective view of the gun rack according to the present invention showing the adjustability of the various components thereof, alternate adjusted positions of these components shown in phantom.

FIG. 4 is an enlarged, fragmentary, elevational view of the hinge element mounted to the lower end of each of the support legs.

FIG. 5 is a side elevational, fragmentary view of the forward end of the gun rack depicting the mounting of the hinge element to the forward end of the main support frame.

FIG. 6 is an endwise elevational view of the front end of the main support member and hinge shown in FIG. 5.

FIG. 7 is a fragmentary perspective view of an alternate embodiment of the barrel support element.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
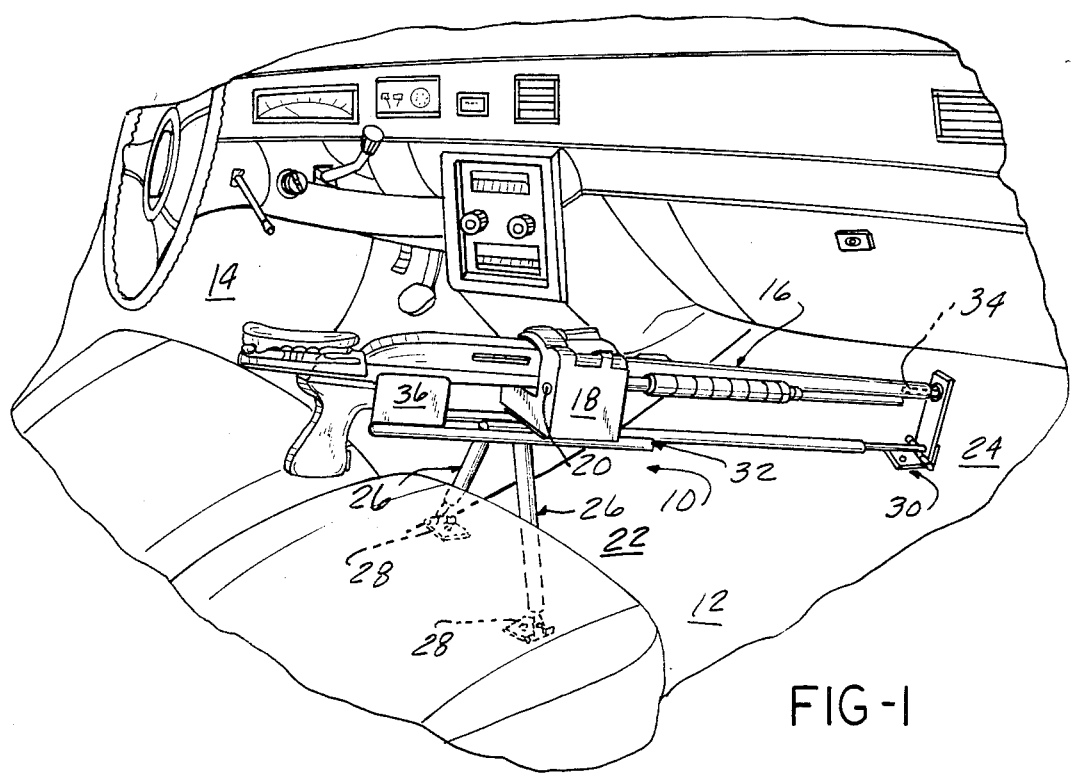
FIG. 1 is a perspective view showing a gun rack according to the present invention mounted within a passenger compartment of an automotive vehicle together with a gun lock and long gun installed therein.

Referring to FIG. 1, the gun rack 10, according to the present invention, is shown in a mounted position intermediate the passenger seat 12 and the driver's seat 14 within an automotive passenger compartment.

The gun rack 10 mounts a gun, shown as a shotgun 16, which is retained in a gun lock assembly 18. Such gun lock assemblies 18 are commercially available and are typically operated by key locks 20, or may also be operated by means of an electrical switch, as is well known to those skilled in the art.

The gun rack 10 is mounted to the tunnel 22 and adjacent floor 24 contours of the passenger compartment by means of a bi-pod support, comprised of movable support leg assemblies 26, which can be moved along main support frame 32, each having hinges 28 mounted at the lower ends thereof which are adapted to receive fastener elements so as to be mounted to the sheet metal forming the tunnel 22.

The gun rack 10 is supported at its forward end by means of a hinge 30, likewise adapted to be secured to the floor sheet metal. This thus provides a three-point support, with the elevation of the rear portion of the gun rack 10 providing a downward tilt of the gun rack 10 and the supported long gun 16 such as to provide the "muzzle down" mounting thereof.

The gun rack 10 includes a main support frame 32 which at its forward end mounts a gun barrel receiving element consisting of a plug 34 which is sized to be received within the bore of the long gun 16 to stabilize and position the forward end of the long gun 16 in the gun rack.

The position of the element 34 is adjustable lengthwise by means of telescoping components as will be described hereinafter to accommodate varying long gun barrel lengths.

To the rear of the main support frame 32 there is located a saddle-shaped trigger shroud 36 which, as shown, substantially surrounds the trigger region of the long gun 16 to prevent accidental discharge.

The lengthwise position of the shroud 36 is also adjustable to accommodate varying configurations of long guns 16, as will be described hereinafter.

The position of each of the mounting points defined by the hinges 28 and 30 is capable of an almost infinite variety of adjustment throughout the length of frame 32 in order to accommodate tunnel and floor contours of widely varying contours as well as varying size and configurations of the mounted long gun and other equipment such as radios, computers, etc. These various adjustments can be seen by reference to FIGS. 2-6.

Referring to FIG. 2, the main frame 32 includes an elongated frame member consisting of an elongated tube 38 which has affixed thereto a spacer ring 40 at its rear end which in turn has welded thereto a platform mounting plate 42 having mounting holes 44 formed therein in order to be adapted to have the locking assembly 18 mounted thereto.

At the forward end of the tubular support member 38 there is received an elongated shaft 48 which is slidably received within the tubular main support member 38 to allow for lengthwise adjustment in the position thereof. A set screw 50 is provided to secure the support member in its adjusted position.

The shaft 48 has affixed thereto a support plate 52 which mounts the barrel receiving element 34 at its upper end extending parallel to the main support member 38 but spaced above the same to be in line with the barrel of the long gun 16. The barrel support element 34 is preferably constructed of a non-marring, tough plastic material such as nylon and is formed with a flange 54 to allow abutment of the barrel thereagainst without marring.

As shown in FIG. 7, a stirrup element 34A aligned with a through opening 35 in the support plate 52 may also be used. The stirrup element is partially cylindrically shaped. The upper portion of support plate 52 adjacent to the stirrup and the stirrup are rubber or plastic coated to provide a non-marring characteristic.

As can be seen in FIG. 2, the lengthwise adjustment of the shaft 48 and plate 52 will enable accommodation of differing gun barrel lengths as well as variations in position of a hinge 30 at the forward end of the shaft 48.

The hinge 30 is formed with two elements 56 and 58 pivotally mounted with respect to each other by a hinge pin 31 to enable changes in angular position. One of the elements 58 is mounted for pivoting about an axis transverse to the hinge axis by being held in place by a mounting washer 60 welded to the end of the shaft 48 and with a running fit enabling free pivoting motion of the hinge 30 about that axis, as indicated in FIG. 6. The hinge 30 may be mounted with the hinge pin 31 facing the rear as shown in FIG. 6, or forwardly as an alternate embodiment.

The free hinge element 56 is provided with a mounting hole 62 to receive the fasteners utilized for mounting to the floor or tunnel sheet metal of the auto passenger compartment within which the rack 10 is to be mounted.

The tubular main support member 38 receives a pair of collars 46 which form a part of each leg assembly 26. The collars 46 enable an angular adjustment in the position of each of the leg assemblies 26 with respect to the tubular main support member 38.

Figure 3:
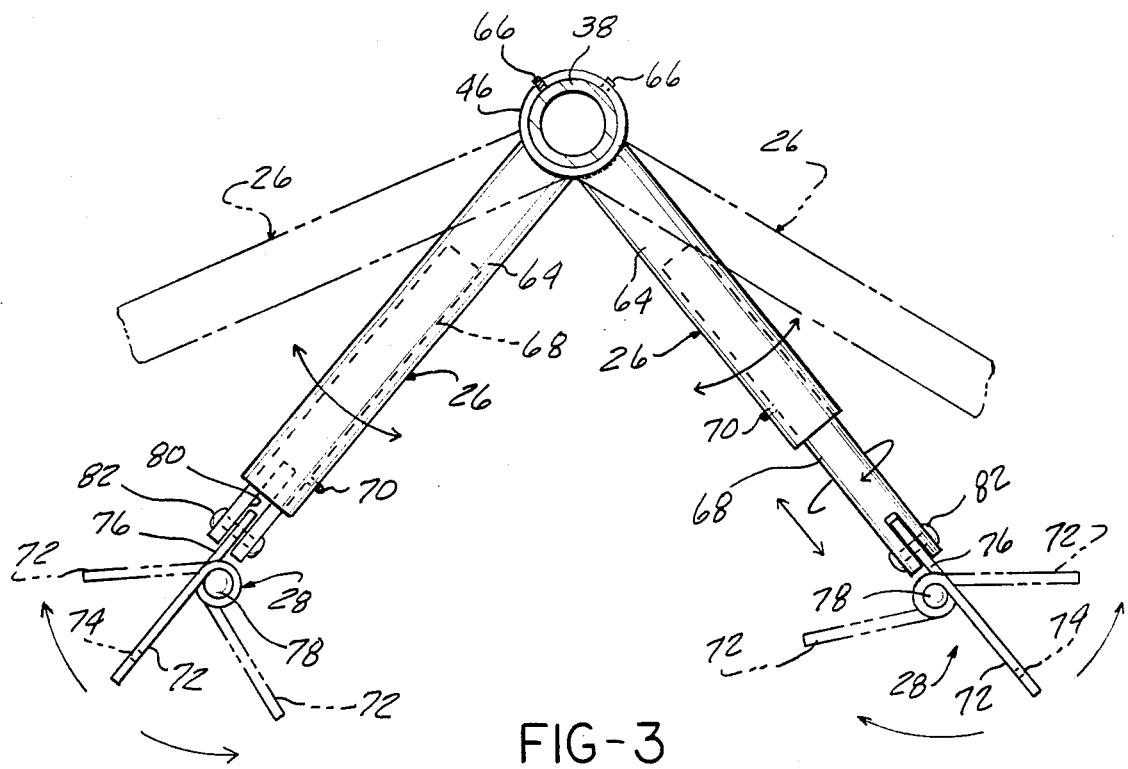
FIG. 3 is a sectional view of the gun rack shown in FIG. 2, showing the adjustability of the support legs.

Each of the leg assemblies 26, as seen in FIGS. 2 and 3, are of tubular construction including a tubular upper member 64, welded or otherwise secured to a respective collar 46, which in turn is, as noted, slidably received within the tubular main support member 38. This allows an adjustment in angular position of each of the leg assemblies 26, with a set screw 66 enabling securement of the particular leg assembly 26 in any angularly adjusted position as indicated in phantom in FIG. 3.

Slidably received within each tubular uppper member 64 is a lower leg member 68 constructed of a bar or shaft which is slidably received within the interior of its respective upper tubular arm member 64, such as to provide an independent adjustment in the length of each leg assembly 26, which adjusted position is maintained by set screw 70 as seen in FIG. 3.

Each of the lower arm members 68 has a hinge 28 affixed thereto including a first element 72 formed with a fastener receiving opening 74 for affixing the same to the floor of the car within which the gun rack is mounted.

The second hinge element 76 is pivotally connected to the first hinge element by means of a hinge pin 78 which enables relative angular adjustment of these elements about the hinge axis created by the hinge pin 78. A second hinge element 76 is pivotally mounted to the lower end of the respective lower arm member 68 by being received within a slot machined into the lower end 80 of the lower arm member 68, retained by means of a rivet fastener 82 passing therethrough.

This thus allows pivotal adjustment of the hinges 28 about the axis transverse to the hinge axis allowing a great adjustment capability to adapt to the particular surface location to which the hinge 28 is to be affixed.

In addition, the lower arm members 68 may also be rotated within the upper tubular arm member 64 to provide rotation about three perpendicular axes, as seen in FIG. 4.

The saddle-shaped trigger shroud 36 is likewise mounted for lengthwise adjustment by virtue of its support on a "U" shaped member 84 having the free ends received within collars 86 welded, drilled or otherwise joined to the spacer ring 40. A set screw 88, as shown in FIG. 2, secures each adjusted position.

The adjustment in lengthwise position of the saddle-shaped trigger shroud 36 is shown in phamtom in FIG. 2.

Accordingly, it can be appreciated that the recited objects of the present invention are achieved by the gun rack described herein, inasmuch as the capability of the gun rack to have its mounting points able to be adjusted to the contours of the tunnel and floor surface to which the gun rack is to be mounted is almost unlimited.

The gun rack is likewise adaptable to shotguns of widely varying configurations and which may all be positioned in the preferred muzzle down position between the driver and passenger seat.

At the same time, the configuration of the gun rack is relatively simple, able to be manufactured at relatively low cost, yet very reliably adaptable to its intended purpose.

Many variations in the specifics from the abovedescribed embodiment are, of course, possible within the scope of the appended claims. For example, the spacer ring 40 and collars 86 can be provided by a section of hollow bar having appropriate bores machined thereinto.

The great flexibility afforded by the many adjustments also allows repositioning of the gun itself, as by rotating the spacer ring 40 on shaft 38 which allows an onside position of the shotgun to increase the overhead clearance for equipment.

I claim:

1. A gun rack providing an adjustable support for mounting long guns on the floor tunnel of automotive passenger compartments comprising:
an elongated main support member;
a pair of leg assemblies mounted along said main support member, said leg assembly including means mounting one end of each of said leg members to said main support member, said means allowing independent adjustment of the relative angular position of each of said legs with respect to said main support member;
a mounting platform secured to said main support member and adapted to mount a locking assembly configured to receive and retain a long gun therein;
mounting means carried by the other end of each of said leg assemblies, and on a front end of said main support member offset from said leg assemblies, each of said mounting means comprising a mounting plate and pivot means pivoting each of said mounting plates to each other end of each leg assembly and front end of said main member respectively, said pivot means for said mounting plate carried by said front end of said main member allowing both up and down and side to side pivoting movement of said mounting plate, said side to side pivoting movement being substantially unlimited to enable disposition of said mounting plate substantially perpendicularly and along one side of said front end of said main support member to be able to be fastened against a side surface of said tunnel contour, whereby adjustable three point support of said main support member on a tunnel contour is enabled.

2. The gun rack according to claim 1 further including a gun barrel receiving element and means mounting said element above the front end of said main support member and adapted to receive the barrel of a long gun mounted in said rack to laterally stabilize the front end thereof.

3. The gun rack according to claim 2 wherein said means mounting said gun barrel receiving element comprises an elongated support shaft slidably received within a bore extending into said front end of said main support member, and means for securing said support shaft in adjusted positions in said bore to enable adjustments for varying barrel lengths of mounted long guns.

4. The gun rack according to claim 3 wherein said gun barrel receiving element comprises a non-metallic flanged plug extending rearwardly from said front end of said main support, and sized to be inserted into the bore of the barrel of a long gun, the forward end of said barrel abutting against said flange.

5. The gun rack according to claim 1 wherein said means mounting each of said leg assemblies to said main support comprises a collar affixed to said one end of each of said leg members and wherein said main support member includes a cylindrical section receiving each of said collars with a running fit therein to enable said angular adjustment.

6. The gun rack according to claim 5 wherein each of said leg members of said leg assemblies is comprised of a tubular upper member having one of said collars affixed thereto, and a lower member slidably received in said tubular upper member, and means for securing said lower member in any adjusted position therein to enable length adjustment of said leg members.

7. The gun rack according to claim 1 wherein each of said leg members is of adjustable length.

8. The gun rack according to claim 6 wherein each of said lower leg members has said mounting means mounted at the lower end thereof, and wherein each of said mounting means carried by said leg members is comprised of a two-element hinge, said elements pivotable about a hinge axis, and wherein one of said elements of each of said hinges is pivotally mounted to a lower leg member for angular adjustment about an axis transverse to said hinge axis.

9. The gun rack according to claim 8 wherein said mounting means carried by said front end of said main support member is comprised of a two-element hinge, said elements pivotable with respect to each other about a hinge axis and further including means mounting one of said elements to the front end of said main support member, allowing pivoting about an axis transverse to said hinge axis to enable angular adjustment thereof.

10. The gun rack according to claim 1 further including a saddle-shaped trigger shroud and means mounting said shroud to the rear end of said main support member oriented to enable said trigger shroud to be positioned about and below the regions adjacent the trigger of a long gun disposed therein.

11. The gun rack according to claim 10 wherein said means mounting said trigger shroud to said rear end of said main support includes a pair of spaced rods slidably received therein; and wherein said trigger shroud is affixed to said rods to enable front and rear adjustment of the position thereof.

12. The gun rack according to claim 11 further including a gun barrel receiving element and means mounting said element above the front end of said main support member and adapted to receive the other barrel of a long gun mounted in said rack to stabilize the front end thereof.

13. The gun rack according to claim 12 wherein said means mounting said gun barrel receiving element comprises an elongated barrel support member slidably received within said bore extending into said front end of said main support member, and means for securing said barrel support member in adjusted positions in said bore to enable adjustments for barrel length.

14. The gun rack according to claim 13 wherein said gun barrel receiving element comprises a non-metallic flanged plug extending rearwardly from said front end of said main support, and sized to be inserted into the bore of the barrel of a long gun, the forward end of said barrel abutting against said flange.

15. The gun rack according to claim 14 wherein said means mounting each of said leg assemblies to said main support comprises a collar affixed to said one end of each of said leg members and wherein said main support member includes a cylindrical section receiving each of said collars with a running fit therein to enable said angular adjustment.

16. The gun rack according to claim 15 wherein each of said leg members of said leg assemblies is comprised of a tubular upper member having one of said collars affixed thereto, and a lower member slidably received in said tubular upper member, and means for securing said lower member in any adjusted position therein to enable length adjustment of said leg members.

17. The gun rack according to claim 15 wherein each of said leg members is of adjustable length.

18. The gun rack according to claim 16 wherein each of said lower leg members has said mounting means mounted at the lower end thereof, and wherein each of said mounting means carried by said leg members is comprised of a two-element hinge, said elements pivotable about a hinge axis, and wherein one of said elements of each of said hinges is pivotally mounted to a lower leg member for angular adjustment about an axis transverse to said hinge axis.

19. The gun rack according to claim 2 wherein said gun barrel receiving element is comprised of a partially cylindrical stirrup element, and said means mounting said element is comprised of a support plate affixed to said front end of said main support member, said support plate being formed with a through bore aligned with said stirrup element.

20. The gun rack according to claim 12 wherein said gun barrel receiving element is comprised of a partially cylindrical stirrup element, and said means mounting said element is comprised of a support plate affixed to said front end of said main support member, said support plate being formed with a through bore aligned with said stirrup element.

* * * * *